(12) United States Patent
Fahrig

(10) Patent No.: US 10,691,363 B2
(45) Date of Patent: *Jun. 23, 2020

(54) VIRTUAL MACHINE TRIGGER

(71) Applicant: Microsoft Technology Licensing, LLC, Redmond, WA (US)

(72) Inventor: Thomas Fahrig, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/254,381

(22) Filed: Jan. 22, 2019

(65) Prior Publication Data

US 2019/0227728 A1 Jul. 25, 2019

Related U.S. Application Data

(63) Continuation of application No. 15/474,229, filed on Mar. 30, 2017, now Pat. No. 10,185,514, which is a continuation of application No. 14/719,312, filed on May 21, 2015, now Pat. No. 9,639,292, which is a continuation of application No. 13/090,739, filed on Apr. 20, 2011, now Pat. No. 9,043,562.

(51) Int. Cl.
*G06F 12/02* (2006.01)
*G06F 3/06* (2006.01)
*G06F 9/455* (2018.01)
*G06F 9/50* (2006.01)

(52) U.S. Cl.
CPC ........ *G06F 3/0644* (2013.01); *G06F 9/45533* (2013.01); *G06F 9/45558* (2013.01); *G06F 9/5077* (2013.01); *G06F 2009/45583* (2013.01)

(58) Field of Classification Search
None
See application file for complete search history.

(56) References Cited

U.S. PATENT DOCUMENTS

2011/0047310 A1* 2/2011 Bonola .................... G06F 13/24
710/268
2011/0154318 A1* 6/2011 Oshins .................. G06F 3/0647
718/1

* cited by examiner

*Primary Examiner* — Charles Rones
*Assistant Examiner* — Ryan Dare
(74) *Attorney, Agent, or Firm* — BakerHostetler

(57) ABSTRACT

A computing system includes a parent partition, child partitions, a hypervisor, shared memories each associated with one of the child partitions, and trigger pages each associated with one of the child partitions. The hypervisor receives a system event signal from one of the child partitions and, in response to receiving the system event signal, accesses the trigger page associated with that child partition. The hypervisor determines whether the trigger page indicates whether data is available to be read from the shared memory associated with the child partition. The hypervisor can send an indication to either the parent partition or the child partitions that data is available to be read from the shared memory associated with the child partition if the hypervisor determines that the trigger page indicates that data is available to be read from the shared memory associated with the child partition.

20 Claims, 9 Drawing Sheets

VIRTUAL MACHINE TRIGGER

CROSS REFERENCE TO RELATED APPLICATIONS

This application is a continuation of U.S. patent application Ser. No. 15/474,229, filed Mar. 30, 2017, which is a continuation of U.S. patent application Ser. No. 14/719,312, filed May 21, 2015, now U.S. Pat. No. 9,639,292, issued on May 2, 2017, which is a continuation of U.S. patent application Ser. No. 13/090,739, filed Apr. 20, 2011, now U.S. Pat. No. 9,043,562, issued on May 26, 2015, the entire contents of which are incorporated herein by reference.

BACKGROUND

In a virtualization environment virtualizing software (typically called a hypervisor or virtual machine monitor) is installed on the computer system. The hypervisor multiplexes processors and memory among each of plurality of virtual machine partitions. In some virtualization systems, one of the virtual machine partitions can be a parent partition which has access to hardware devices and can virtualize hardware requests of the other virtual machine partitions.

In order for the parent partition to virtualize hardware requests of the other virtual machine partitions, data is passed between the parent partition and each of the child partitions. In some instances, shared memories can be used by child partitions to facilitate communication between a parent partition and the child partitions. A system that is used to communicate between partions is sometimes referred to as a virtual machine bus system.

One difficulty with virtual machine systems is that, when one partition writes data to a shared memory, another partition does not know that data has been written to the shared memory. One simple solution to this issue is to have both the parent partition and child partition regularly check the shared memory. However, constant checking of shared memories consumes a lot of processing resources and is inefficient.

SUMMARY

The inventions relate to passing data between virtual machine partitions. In one embodiment, a computing system includes a parent partition, child partitions, a hypervisor, shared memories each associated with one of the child partitions, and trigger pages each associated with one of the child partitions. The hypervisor receives a system event signal from one of the child partitions and, in response to receiving the system event signal, accesses the trigger page associated with that child partition. The hypervisor determines whether the trigger page indicates that data is available to be read from the shared memory associated with that child partition. The hypervisor can send an indication to the parent partition that data is available to be read from the shared memory associated with the child partition if the hypervisor determines that the trigger page indicates that data is available to be read by the parent partition. The hypervisor can also send an indication to the child partition that data is available to be read from the shared memory associated with the child partition if the hypervisor determines that the trigger page indicates that data is available to be read by the parent partition.

In another aspect of the present application, each child partition writes data to the shared memory associated with the child partition before sending the system event to the hypervisor. The child partition accesses an output portion of the trigger page associated with the child partition after writing the data to the shared page and determines whether the output portion indicates that data is available in the shared memory to be read by the parent partition. If the output portion does not indicate that data is available in the shared memory to be read by the parent partition, the child partition modifies the output portion to indicate that data is available in the shared memory to be read by the parent partition.

In another aspect of the present application, the hypervisor is configured to access the trigger pages based on an intercept in the hypervisor, such as a hypervisor-initiated time slice intercept. In yet another aspect of the present application, the hypervisor is configured to identifies certain trigger events in the computing system. Upon identifying a trigger event, the hypervisor accesses each of the trigger pages to determine if any shared memory contains data which is available to be read by the parent partition or any of the child partitions. If any of the trigger pages indicate that data is available to be read in any of the shared memories, the hypervisor sends an indication to the appropriate partition that data is available to be read by the partition.

DETAILED DESCRIPTION OF ILLUSTRATIVE EMBODIMENTS

Figure 1:
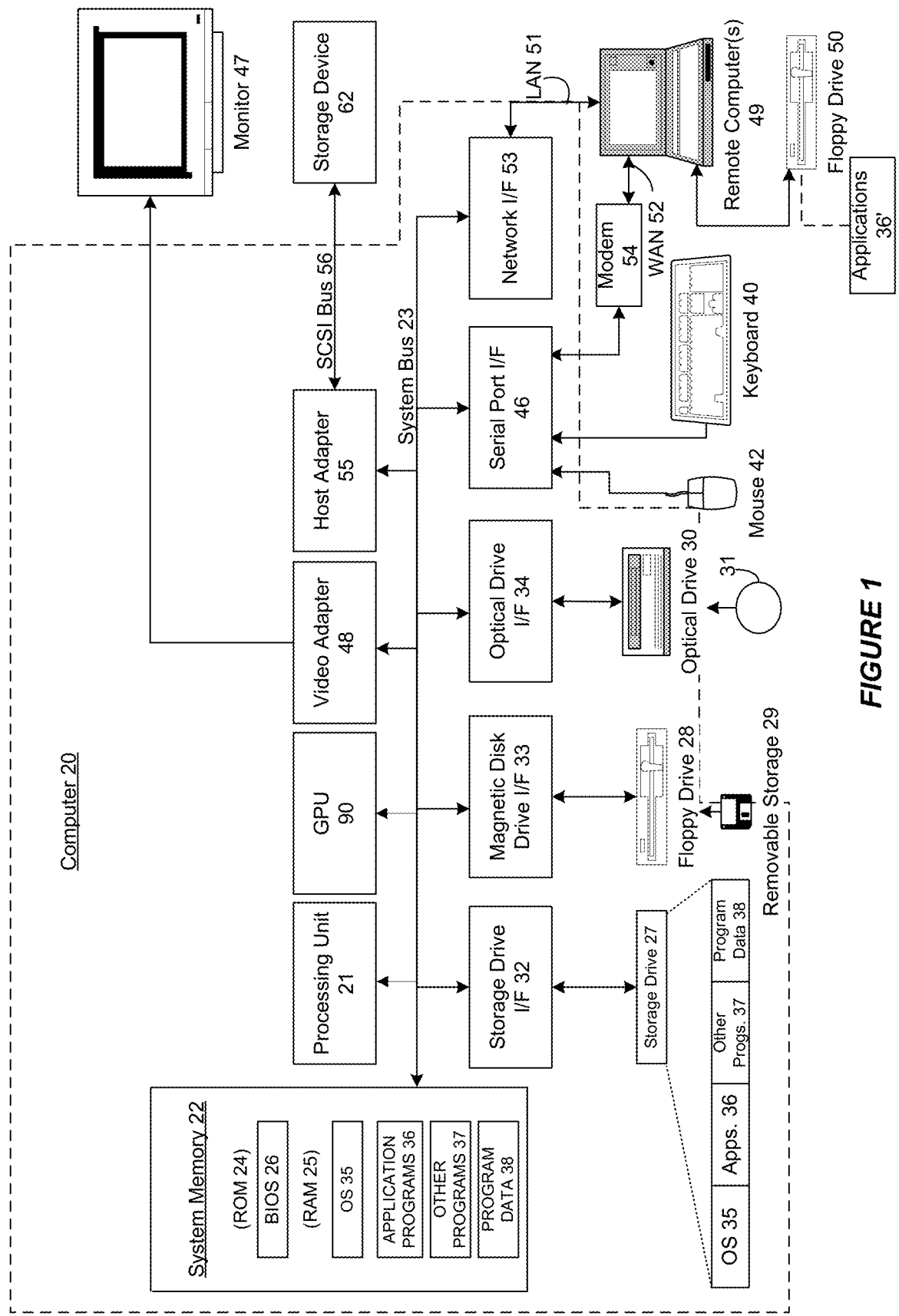
FIG. 1 depicts a block diagram of a computer system.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20. Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
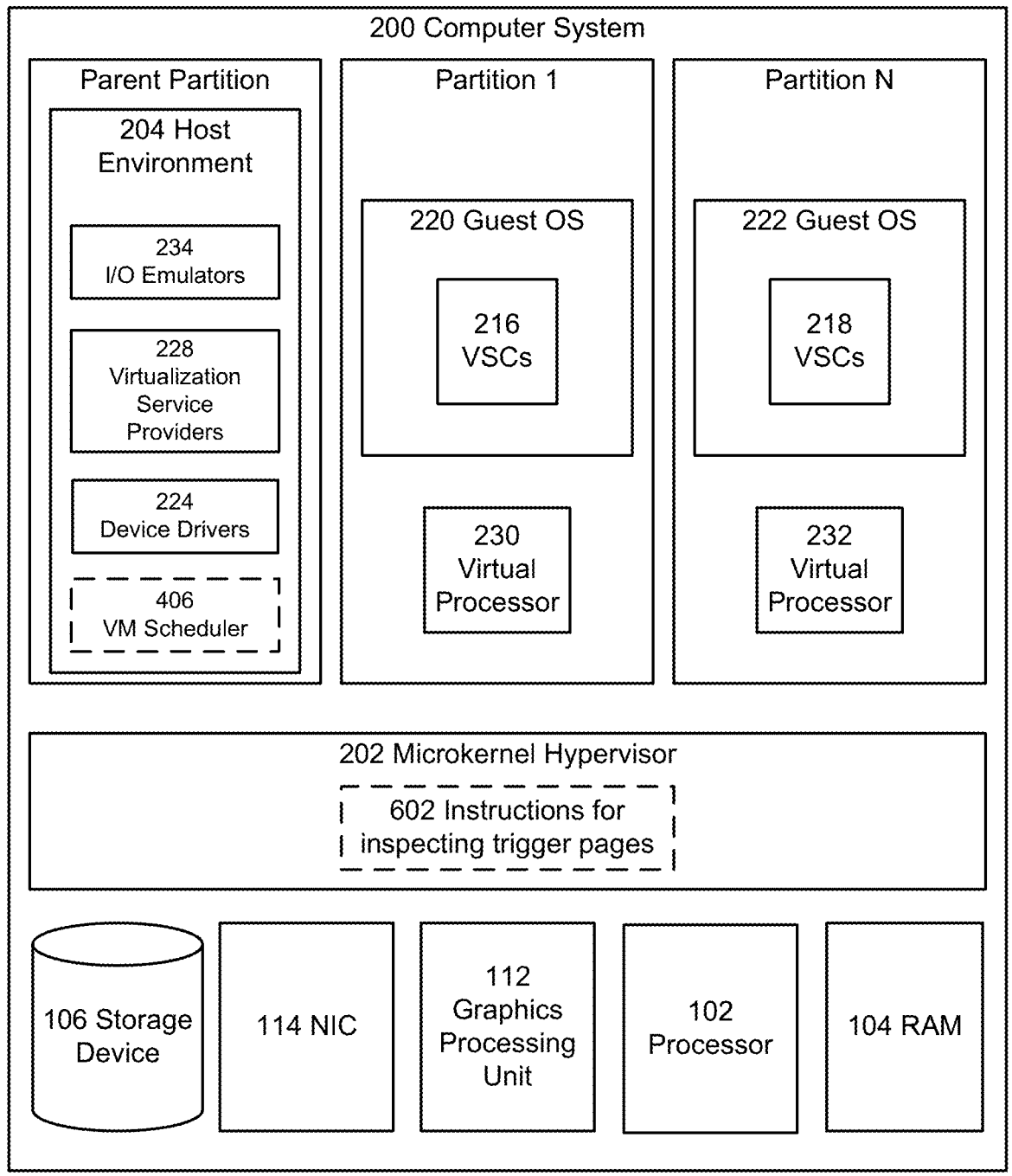
FIG. 2 depicts a block diagram of an exemplary architecture for a virtualizing software program.

Turning to FIG. 2, illustrated is an exemplary virtualization platform that can be used to generate virtual machines. In this embodiment, microkernel hypervisor 202 can be configured to control and arbitrate access to the hardware of computer system 200. Microkernel hypervisor 202 can generate execution environments called partitions such as child partition 1 through child partition N (where N is an integer greater than 1). Here, a child partition is the basic unit of isolation supported by microkernel hypervisor 202. Microkernel hypervisor 202 can isolate processes in one partition from accessing another partition's resources. In particular, microkernel hypervisor 202 can isolate kernel mode code of a guest operating system from accessing another partition's resources as well as user mode processes. Each child partition can be mapped to a set of hardware resources, e.g., memory, devices, processor cycles, etc., that is under control of the microkernel hypervisor 202. In embodiments, microkernel hypervisor 202 can be a stand-alone software product, a part of an operating system, embedded within firmware of the motherboard, specialized integrated circuits, or a combination thereof.

Microkernel hypervisor 202 can enforce partitioning by restricting a guest operating system's view of the memory in a physical computer system. When microkernel hypervisor 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by microkernel hypervisor 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system operating in a virtual partition, operates much the same way that an operating system operates on a physical machine. A guest operating system may virtualize guest physical memory through the same virtual memory management techniques that an operating system applies to physical memory. Virtual memory management is a technique that allows an operating system to over commit memory and to give an application sole access to a logically contiguous working memory. And just as an operating system uses page tables in a physical environment, in a virtualized environment, a guest operating system can use one or more page tables, called guest page tables in this context, to translate virtual addresses, known as virtual guest addresses into guest physical addresses. In this example, a memory address may have a guest virtual address, a guest physical address, and a system physical address.

In the depicted example, parent partition component, which can also be thought of as similar to domain 0 of Xen's open source hypervisor can include a host environment 204. Host environment 204 can be an operating system (or a set of configuration utilities) and host environment 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in they communicate with host environment 204 via VSPs instead of communicating with hardware or emulated hardware. In an exemplary embodiment the path used by virtualization service providers 228 to communicate with virtualization service clients 216 and 218 can be thought of as the enlightened IO path.

As shown by the figure, emulators 234, e.g., virtualized IDE devices, virtualized video adaptors, virtualized NICs, etc., can be configured to run within host environment 204 and are attached to emulated hardware resources, e.g., IO ports, guest physical address ranges, virtual VRAM, emulated ROM ranges, etc. available to guest operating systems 220 and 222. For example, when a guest OS touches a guest virtual address mapped to a guest physical address where a register of a device would be for a memory mapped device, microkernel hypervisor 202 can intercept the request and pass the values the guest attempted to write to an associated emulator. Here, the emulated hardware resources in this example can be thought of as where a virtual device is located in guest physical address space. The use of emulators in this way can be considered the emulation path. The emulation path is inefficient compared to the enlightened IO path because it requires more CPU time to emulate devices than it does to pass messages between VSPs and VSCs. For example, several actions on memory mapped to registers are required in order to write a buffer to disk via the emulation path, while this may be reduced to a single message passed from a VSC to a VSP in the enlightened IO path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be directly executed by physical processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
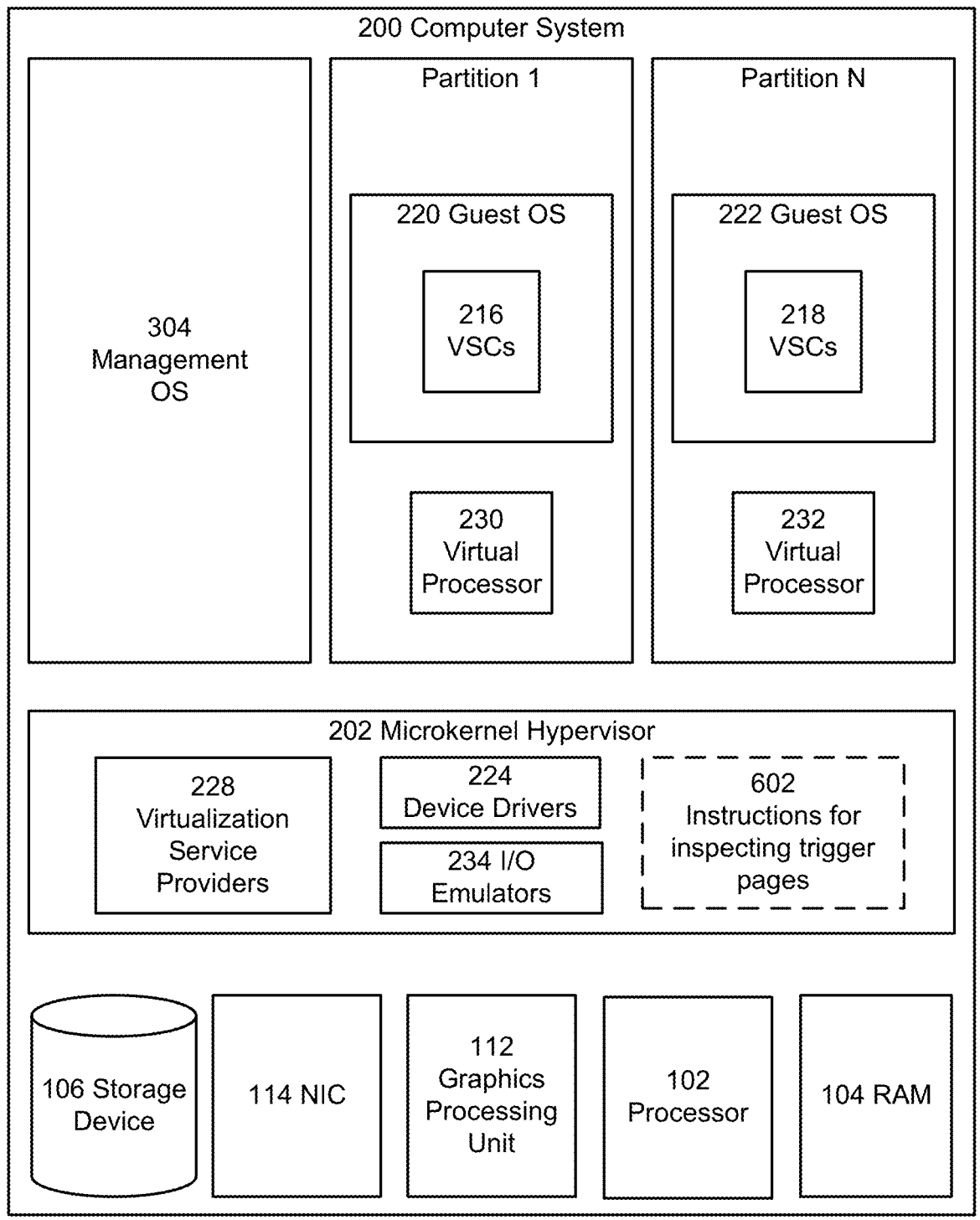
FIG. 3 depicts a block diagram of an alternative architecture for a virtualizing software program.

Referring now to FIG. 3, it illustrates an alternative virtualization platform to that described above in FIG. 2. FIG. 3 depicts similar components to those of FIG. 2; however, in this example embodiment hypervisor 302 can include a microkernel component and components similar to those in host environment 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as microkernel hypervisor 202 of FIG. 2; however, in this architecture hypervisor 304 effectuates the enlightened 10 path and includes the drivers for the physical hardware of the computer system. Hypervisor 302 of FIG. 3 can be a stand alone software product, a part of an operating system, embedded within firmware of the motherboard or a portion of hypervisor 302 can be effectuated by specialized integrated circuits.

Figure 4:
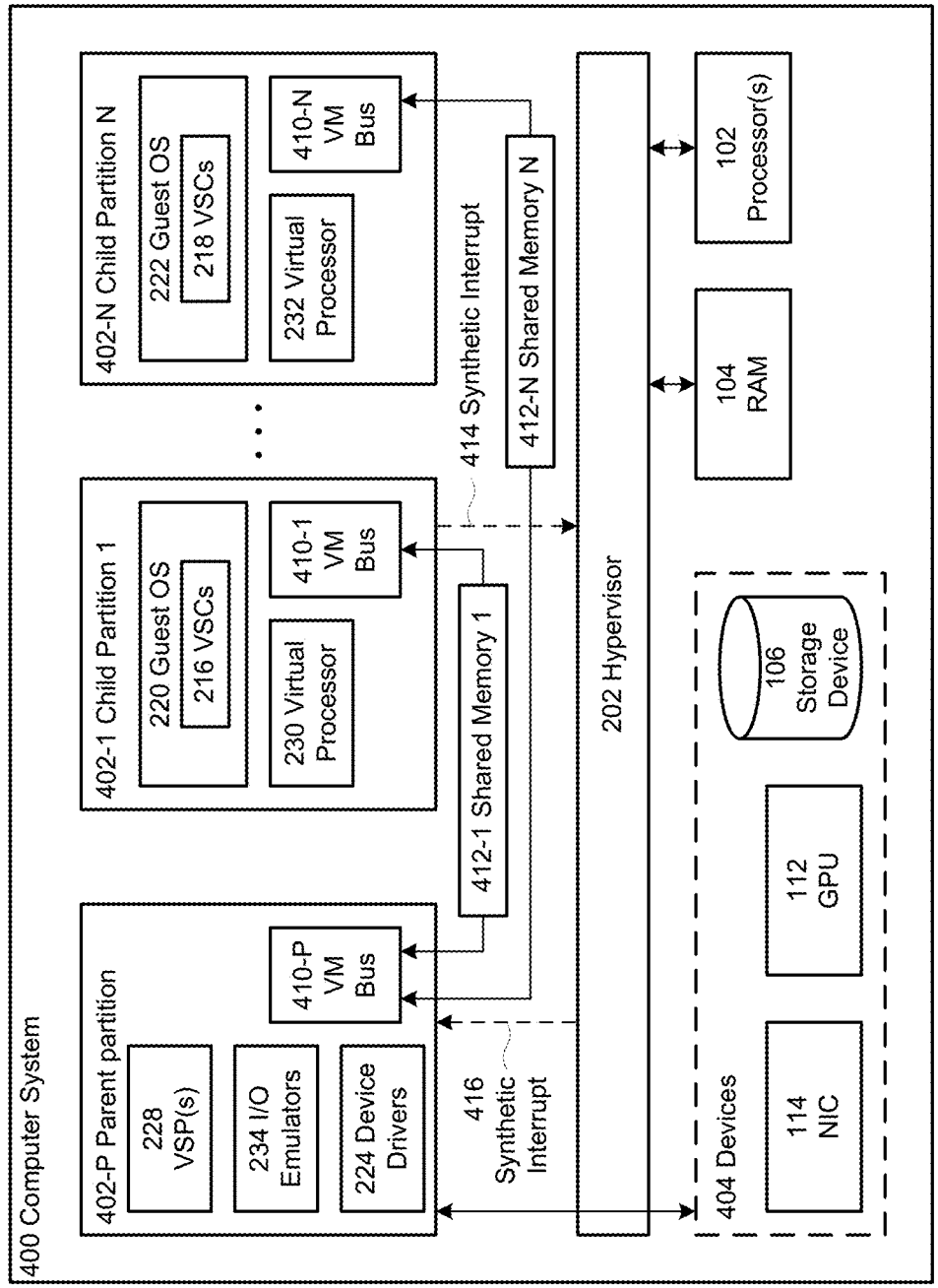
FIG. 4 depicts a system and method for communicating data between virtual machine partitions using synthetic intercept signals.

Referring now to FIG. 4, depicted is an embodiment of communications between child partitions and a parent partition. Hypervisor 202 multiplexes the resources of processors 102 and RAM 104 among each of the hosted parent partition 402-P and child partitions 402-1 and 402-N. As shown, the parent partition 402-P has access to hardware devices 404 in the computer system 400. The child partitions 402-1 and 402-N do not have direct access to the devices 404. In order to utilize the devices 404, a child partition must communicate its device request and any associated data to the parent partition 402-P which executes the device request.

One way to communicate data between a parent partition 402-P and a child partition is to provide each partition with a VM bus component which allows each partition to read from and write to a shared memory associated with a particular child partition. For example, in FIG. 4, parent partition 402-P has a VM bus component 410-P and child partition 402-1 has a VM bus component 410-1. Shared memory 412-1 is associated with child partition 402-1 and facilitates the passage of data between parent partition 402-P and child partition 402-1. Shared memory 412-1 can include one or more memory pages which are dedicated to storing data which is being passed between parent partition 402-P and child partition 402-1. Each of parent partition 402-P and child partition 402-1 can read from and write to shared memory 412-1 using their respective VM bus components 410-P and 410-1. Similarly, child partition 402-N has a VM bus component 410-N and each of parent partition 402-P and child partition 402-N can read from and write to shared memory 412-N using their respective VM bus components 410-P and 410-N.

The configuration depicted in FIG. 4 allows for passage of data between a parent partition and individual child partitions. However, as mentioned above, it is inefficient for each partition to constantly check shared memories to determine whether another partition has written data to the shaved memory. To avoid constant checking of shared memories each partition can be signaled when data is available to be read in a shared memory. For example, child partition 402-1 can write data to shared memory 412-1 for the data to be read by parent partition 402-P. However, without constant checking or being notified, parent partition 402-P is not aware that child partition 402-1 has written data to the shared memory 412-1. Thus, to avoid constant checking of the shared memory by parent partition 402-P, it is advantageous to notify parent partition 402-P that data is available to be read from shared memory 412-1.

FIG. 4 depicts one approach to notifying a partition that data is available to be read in a shared memory. In this approach, after child partition 402-1 writes data to shared memory 412-1, child partition 402-1 sends a synthetic intercept signal 414 to hypervisor 202. The synthetic intercept signal 414 indicates that data is available in shared memory 412-1 to be read by parent partition 402-P. Intercept signal 414 is synthetic in the sense that it is an intercept signal which child partition 402-1 would not send to hypervisor 202 if child partition 402-1 did not need to notify hypervisor 202 that data is available in shared memory 412-1 to be read by parent partition 402-P. Once hypervisor 202 receives the intercept signal 414 from child partition 402-1, hypervisor 202 sends a notification 416 to parent partition 402-P. The notification 416 indicates that data is available to be read in shared memory 412-1. After receiving the notification 416 from hypervisor 202, parent partition 402-P reads the data from shared memory 412-1.

The reverse process of a parent partition sharing data with a child partition, while not depicted in FIG. 4, is similar. For example, after parent partition 402-P writes data to shared memory 412-1, parent partition 402-P sends an intercept signal to hypervisor 202. Once hypervisor 202 receives the intercept signal from parent partition 402-P, hypervisor 202 sends a notification to child partition 402-1. The notification indicates that data is available to be read in shared memory 412-1. After receiving the notification from hypervisor 202, child partition 402-1 reads the data from shared memory 412-1.

The notification process depicted in FIG. 4 is efficient in that it quickly notifies parent partition 402-P when data from child partition 402-1 is available to be read in shared memory 412-1. However, this notification process may be an inefficient use of the resources of computing system 400. For example, this notification process requires an intercept signal to be sent to hypervisor 202 every time that data is written to a shared memory by one of the partitions. This can result in a large number of intercepts being sent to the hypervisor 202, increasing the workload of the hypervisor 202 and potentially delaying other processes performed by the hypervisor 202, such as multiplexing the resources of processors 102 and RAM 104 among each of the partitions. This notification process can also be inefficient because the hypervisor 202 cannot differentiate between the priority of any of the intercept signals which indicate that data is available in a shared memory. Since the sending of an intercept signal from a partition to hypervisor 202 is the only way that the data in a shared memory will be read, the hypervisor 202 cannot tell whether individual intercept signals have a high priority or a low priority. Because it is costly to send the initial synthetic intercept to the hypervisor from the partition that writes data to a shared memory, it would be advantageous to avoid sending the synthetic intercept. As described below, the synthetic intercept can be avoided by merely writing data to the shared memory and allowing the hypervisor to determine that the data has been written on its own.

Figure 5:
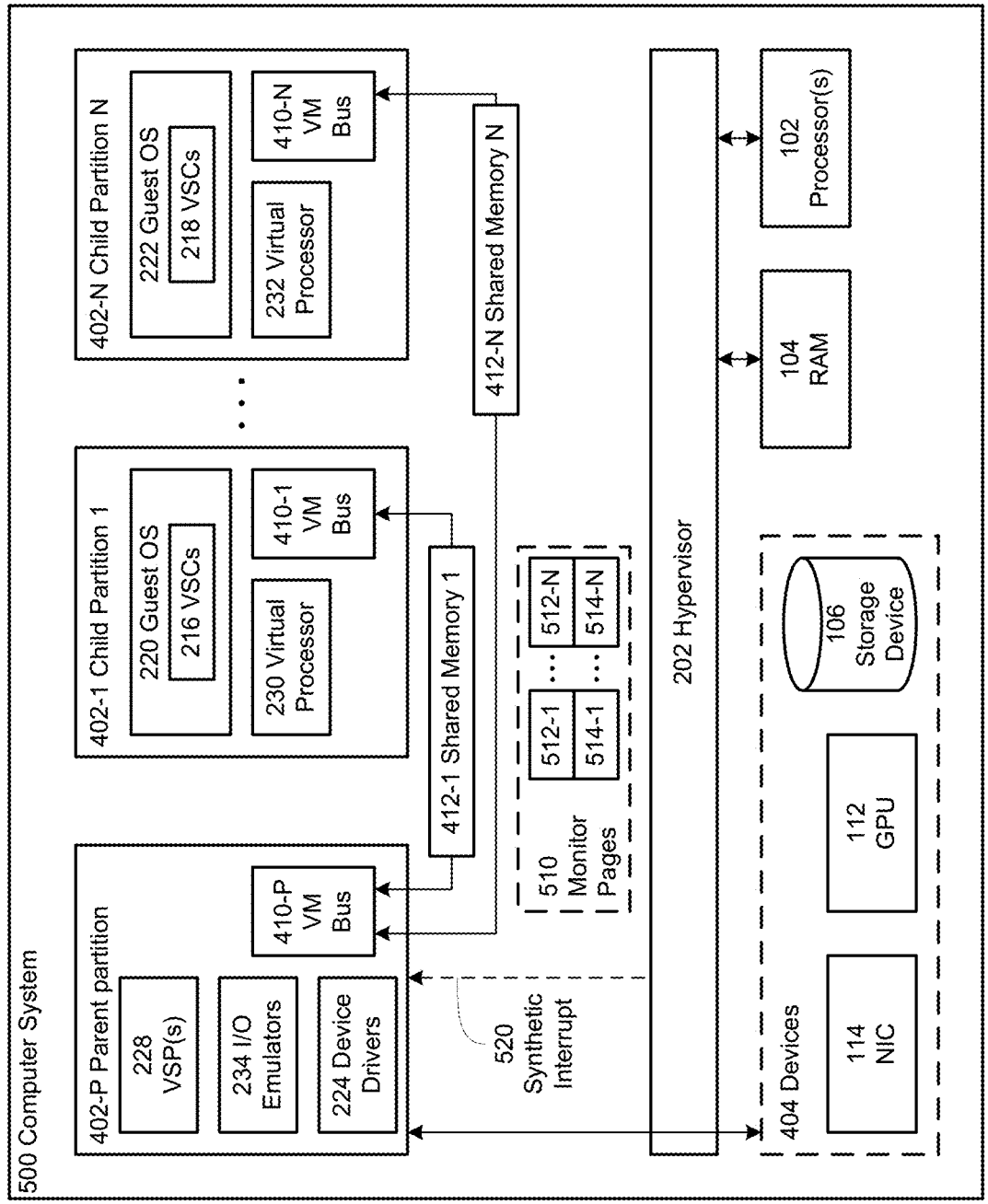
FIG. 5 depicts a system and method for communicating data between virtual machine partitions using a set of monitor pages.

Referring now to FIG. 5, depicted is another configuration and method for notifying a partition that data is available to be read in a shared memory. As shown, computer system 500 includes hardware devices 404, processor(s) 102, RAM 104, a hypervisor 202, partitions 402-P, 402-1, and 402-N, and shared memories 412-1 and 412-N which are similar to corresponding components discussed above with respect to computing system 400. Computer system 500 also includes monitor pages 510 which are managed by hypervisor 202. Monitor pages include an input monitor memory page and an output monitor memory page for each child partition. As shown in FIG. 5, the monitor pages 510 include an input monitor memory page 512-1 and an output monitor memory page 514-1 associated with child partition 402-1, and an input monitor memory page 512-N and an output monitor memory page 514-N associated with child partition 402-N.

In the configuration depicted in FIG. 5, a partition that writes data to a shared memory uses the monitor pages 510 to signal that data is available to be read in a shared memory. For example, after child partition 402-1 writes data to shared memory 412-1, child memory modifies output monitor memory page 514-1 to indicate that data is available in shared memory 412-1 to be read by parent partition 402-P. The hypervisor 202 periodically checks each of the monitor pages 510. When checking each of the monitor pages 510, hypervisor 202 determines that output monitor memory page 514-1 indicates that data is available in shared memory 412-1 to be read by parent partition 402-P. Hypervisor 202 then sends a notification 520 to parent partition 402-P. The notification 520 indicates that data is available in shared memory 412-1 to be read by parent partition 402-P. After receiving the notification 520, parent partition 402-P reads the data is shared memory 412-1 and can then modifies output monitor memory page 514-1 so that it does not indicate that data is available in shared memory 412-1 to be read by parent partition 402-P.

It is important to note that each of the monitor pages 510 is equally treated by the hypervisor. For example, if a particular highly likely event, such as a halt operation from one partition, were to occur, the hypervisor would not be able to target the particular one of the monitor pages 510 corresponding to the partition that initiated the event. Thus, the hypervisor cannot selectively determine which of the shared pages 510 it should inspect first to determine if new data is available to be read. Instead, the hypervisor would need to cycle through all of the monitor pages 510 or wait until the next time that is it scheduled to check the monitor pages 510. Such a process can be inefficient as it introduces latency and unnecessary cycles to check monitor pages 510.

In the reverse direction, which is not depicted in FIG. 5, parent partition 402-P writes data for child partition 402-1 in shared memory 412-1 and then changes input monitor memory page 512-1 to indicate that data is available in shared memory 412-1 to be read by child partition 402-1. When checking each of the monitor pages 510, hypervisor 202 determines that input monitor memory page 512-1 indicates that data is available in shared memory 412-1 to be read by child partition 402-1. Hypervisor then sends a notification to child partition 402-1. The notification that data is available to be read in shared memory 412-1. After receiving the notification, child partition 402-1 reads the data is shared memory 412-1 and modifies input monitor memory page 512-1 so that it does not indicate that data is available in shared memory 412-1 to be read by parent partition 402-P.

The hypervisor 202 manages monitor pages 510 as a collection of pages. Each time the hypervisor checks the monitor pages 510, it checks each of the input pages 512-1 and 512-N and each of the output pages 514-1 and 514-N for each of the child partitions 402-1 and 402-N. In other words, the each time the hypervisor checks the monitor pages 510, it checks twice as many pages as there are child partitions operating in computing system 500. This system is advantageous in that it does not require that an intercept be sent to the hypervisor 202 each time that a partition writes data to a shared memory. However, hypervisor 202 does not have any indication of which of the monitor pages 510 is likely to indicate that data is available to be read in a shared memory. Thus, each time that it checks monitor pages 510, hypervisor individually checks all of the input pages 512-1 and 512-N and all of the output pages 514-1 and 514-N.

The approach depicted in FIG. 5 may have some advantages over the approach of each partition sending intercept signals to the hypervisor each time that a partition write data to a shared memory. However, the use of shared pages 510 also has some disadvantages. For example, hypervisor 202 individually checks both an input page and an output page for each child partition each time that it checks monitor pages 510. Depending on the number of child partitions that are hosted in computing system 500 and the frequency with which hypervisor 202 checks monitor pages 510, the checking of all of the monitor pages 510 can be a burden on hypervisor 202 and can slow the other processes carried out by the hypervisor 202. Furthermore, there is an inherent latency between the time that a partition writes data to shared memory and the time that hypervisor 202 performs the next check of the shared monitor pages. Thus, the use of shared monitor pages places in conflict the desire to have monitor pages 510 frequently checked by hypervisor 202 and the desire not to overburden hypervisor 202 with frequent checking of monitor page 510.

Figure 6:
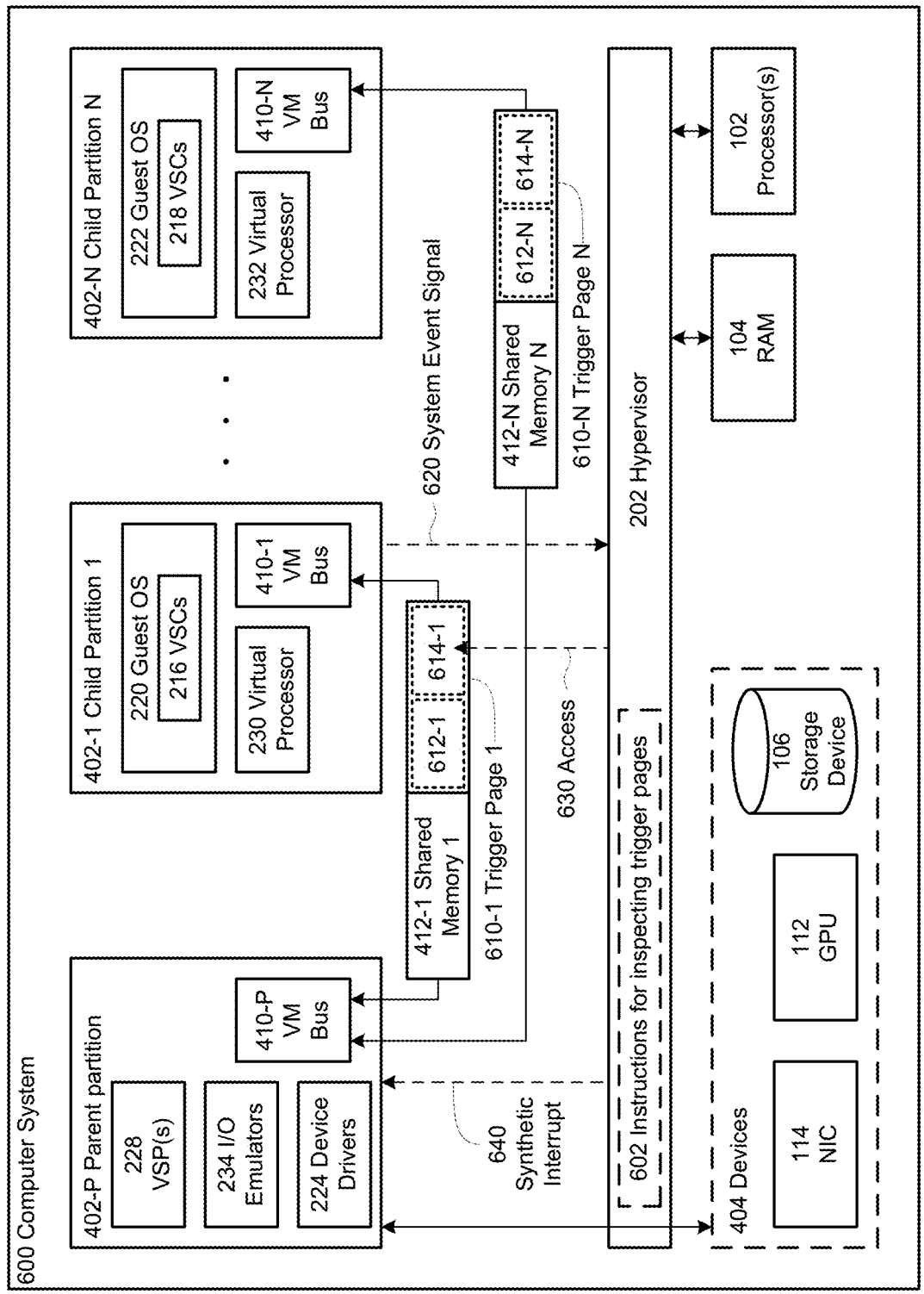
FIG. 6 depicts a system and method for communicating data between virtual machine partitions using trigger pages.

Referring now to FIG. 6, depicted is an embodiment of the present invention for notifying a partition that data is available to be read in a shared memory. As shown, computer system 600 includes hardware devices 404, processor(s) 102, RAM 104, a hypervisor 202, partitions 402-P, 402-1, and 402-N, and shared memories 412-1 and 412-N which are similar to corresponding components discussed above with respect to computing system 400. Computer system 600 also includes a trigger pages associated with each of the child partitions operating in computer system 600. Computer system 600 may also include instructions for hypervisor 202 to access pages 610-1 and 610-N. Trigger page 610-1 can be located in the same memory as shared memory 412-1, in a memory separate from shared memory 412-1, as part of shared memory 412-1, or any other location. Trigger page 610-1 includes an input portion 612-1 and an output portion 614-1. Input portion 612-1 of trigger page 610-1 indicates whether data is available to be read by child partition 402-1. Output portion 614-1 of trigger page 610-1 indicates whether data is available to be read by parent partition 402-P. Trigger page 610-N is associated with child partition 402-N and includes an input portion 612-N and an output portion 614-N similar to trigger page 610-1 discussed above. In one embodiment, each of the trigger pages 610-1 and 610-N is associated with only child partition.

In this configuration, when child partition 402-1 writes data to shared memory 412-1 to be read by parent partition 402-P, it also modifies the output portion 614-1 of trigger page 610-1 to indicate that data is available in shared memory 412-1 to be read by parent partition 402-P. Similarly, when parent partition 402-P writes data to shared memory 412-1 to be read by child partition 402-1, it also modifies the input portion 612-1 of trigger page 610-1 to indicate that data is available in shared memory 412-1 to be read by child partition 402-1. The trigger page 610-1 provides a flag indicating when data is available in shared memory 412-1 to be read by either parent partition 402-P or child partition 402-1. Similar operations are used with respect to trigger page 610-N when parent partition 402-P and child partition 402-P write to shared memory 612-N.

Figure 7:
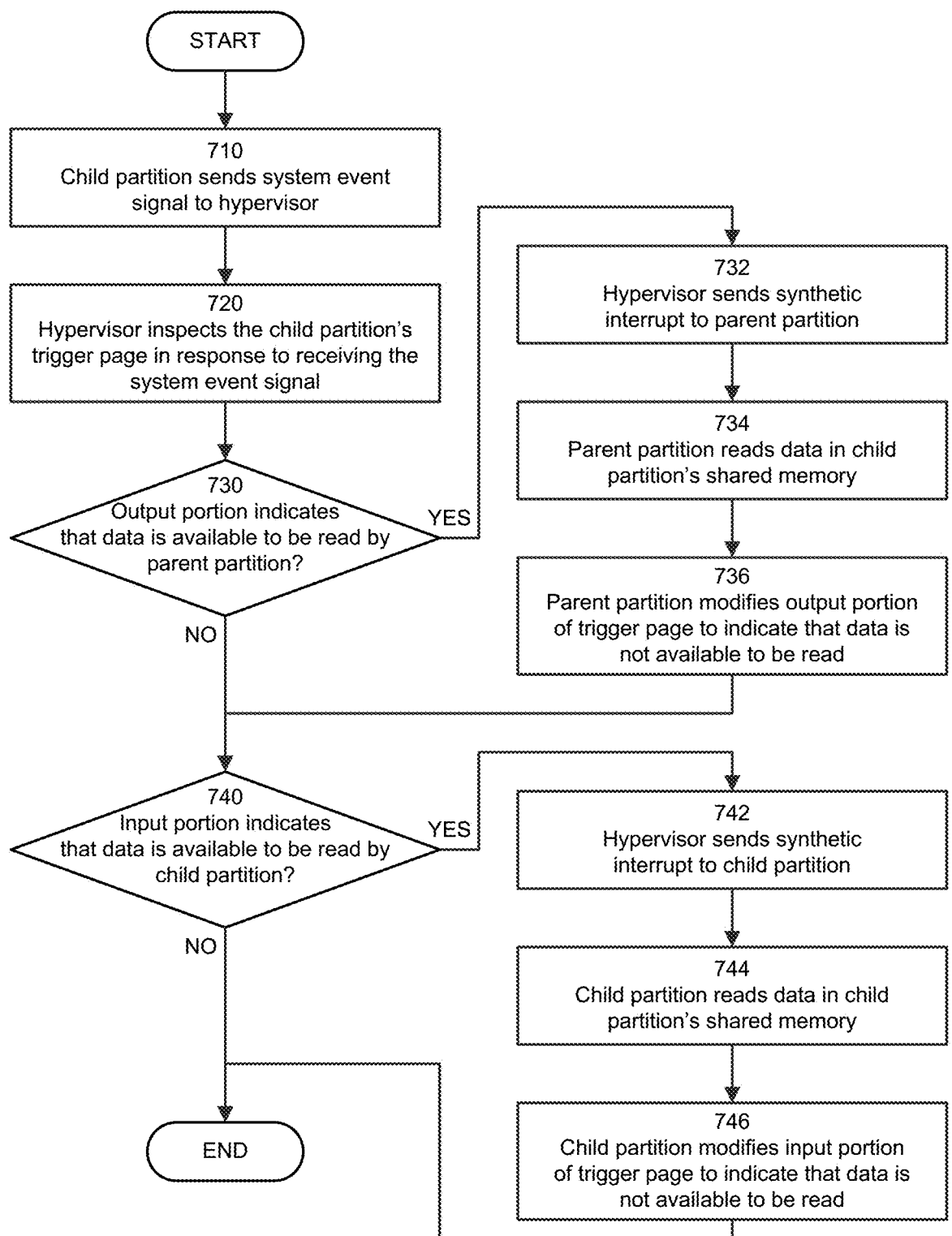
FIG. 7 depicts a method of using a trigger page to notify a virtual machine partition when data is available to read from a shared memory.

Referring now to FIG. 7, depicted is a method for notifying a partition in computing system 600 that data is available to be read in a shared memory. Child partition sends 710 a system event signal 620 to hypervisor 202. A system event signal, as opposed to an intercept signal, is a signal that would be send from the child partition 402-1 to the hypervisor 202 regardless of whether child partition 402-1 had written any data to shared memory 412-1 or modified the output portion 614-1 of the trigger page 610-1. Examples of system event signals include virtual processor halt signals and timeslice end signals. System event signals themselves do not indicate whether data is available in a shared memory. However, the receipt of a system event signal from a child partition may be an appropriate time to check the trigger page associated with that child partition. For example, if child partition 402-1 writes a network I/O request to shared memory 412-1 and modifies the output portion 614-1 of trigger page 610-1. At some later point, child partition may halt and send a virtual processor halt signal to the hypervisor 202 because it is waiting for a response to the network I/O request from parent partition 402-P. Thus, the receipt of the halt system event signal from child partition 402-1 is an appropriate time for hypervisor 202 to check trigger page 610-1 to determine whether data is available in the shared memory 612-1 to be read by one of the partitions.

In response to receiving the system event 620 from child partition 402-1, hypervisor 202 accesses 720 trigger page 610-1 associated with child partition 402-1. Hypervisor 202 determines 730 whether the output portion 614-1 of trigger page 610-1 indicates that data is available in shared memory 412-1 to be read by parent partition 402-P. Hypervisor 202 also determines 740 whether the input portion 612-1 of trigger page 610-1 indicates that data is available in shared memory 412-1 to be read by child partition 402-1.

If the hypervisor 202 determines that the output portion 614-1 of trigger page 610-1 indicates that data is available in shared memory 412-1 to be read by parent partition 402-P, hypervisor 202 sends 732 a notification to parent partition 402-P indicating that data is available to be read in shared memory 412-1. Parent partition then reads 734 data from shared memory 412-1 and modifies 734 the output portion 614-1 of trigger page 610-1 associated with the child partition 402-1 to indicate that data is not available in shared memory 412-1 to be read by parent partition 402-P. If the hypervisor 202 determines that the input portion 612-1 of trigger page 610-1 indicates that data is available in shared memory 412-1 to be read by child partition 402-1, hypervisor 202 sends 742 a notification to child partition 402-1 indicating that data is available to be read in shared memory 412-1. Child partition then reads 744 data from shared memory 412-1 and modifies 744 the input portion 614-1 of trigger page 610-1 associated with the child partition 402-1 to indicate that data is not available in shared memory 412-1 to be read by child partition 402-1.

The maintenance of a single trigger page associated with each child partition in computer system 600 allows the hypervisor 202 to selectively access particular trigger pages in response to receiving particular system events from child partitions. The receipt of a system event from a child partition may be an appropriate trigger for the hypervisor to check the trigger page associated with that child partition. Using the system event as a trigger can also reduce the latency found in computing system 500 without requiring the child partition to send an intercept signal to the hypervisor 202, as is done in computing system 400. While computing system 600 would still permit a child partition to send an intercept signal to hypervisor 202, such as in the case of high priority requests, and computing system 600 would still permit the hypervisor 202 to periodically check all of the trigger pages on a periodic basis, using system events from a child partition as a trigger to check a trigger page for that child partition can reduce the latency in notifying the parent partition of available data to be read without overburdening the hypervisor with intercepts.

Figure 8:
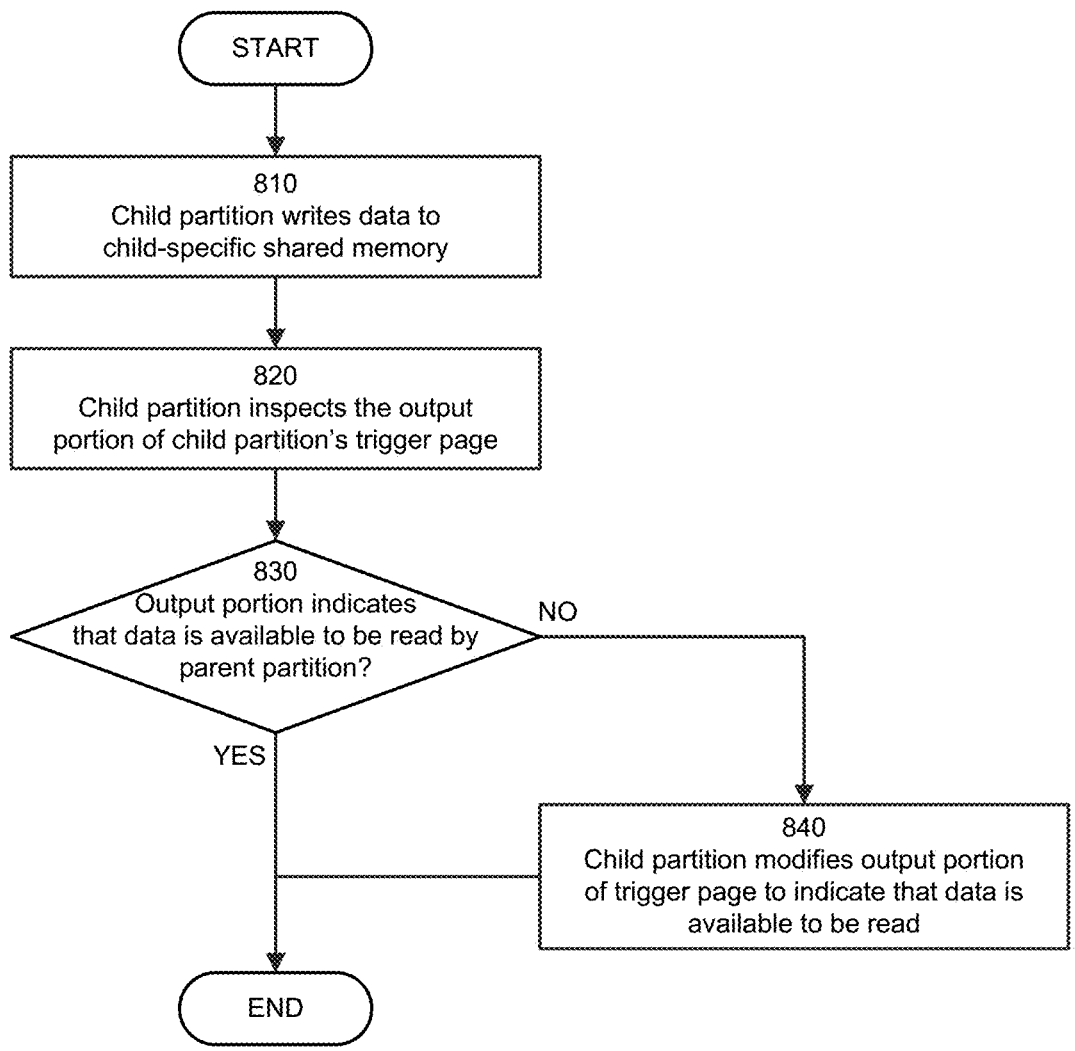
FIG. 8 depicts a method of writing data to a shared memory using a trigger page to signal that data is available to be read from the shared memory.

Referring now to FIG. 8 is another aspect of the present invention. As shown, child partition 402-1 writes 810 data to the shared memory 412-1. After writing the data to the shared memory 412-1, child partition 402-1 accesses 820 the output portion 614-1 of trigger page 610-1 and determines 830 whether output portion 614-1 of trigger page 610-1 indicates that data is available in shared memory 412-1 to be read by parent partition 402-P. If child partition 402-1 determines that output portion 614-1 of trigger page 610-1 does not indicate that data is available in shared memory 412-1 to be read by parent partition 402-P, child partition 402-1 modifies 840 output portion 614-1 of trigger page 610-1 to indicate that data is available in shared memory 412-1 to be read by parent partition 402-P. In one embodiment, while the parent partition 402-P is handling a trigger to read data from shared memory 412-1, the hypervisor will ignore any additional trigger signals from the child partition 402-1 until the parent partition 402-P has read all of the data in shared memory 412-1 and the trigger page 610-1 becomes available for new triggers. Similarly, while the parent partition 402-1 is handling a trigger to read data from shared memory 412-1, the hypervisor will ignore any additional trigger signals from the parent partition 402-P.

Using the process depicted in FIG. 8, child partition 402-1 can batch multiple sets of data for reading by parent partition 402-P. For example, child partition 402-1 writes a first set of data to shared memory 412-1 and accesses the output portion 614-1 of trigger page 610-1. Child partition 402-1 determines that output portion 614-1 of trigger page 610-1 does not indicate that data is available in shared memory 412-1 to be read by parent partition 402-P, and child partition 402-1 modifies output portion 614-1 of trigger page 610-1 to indicate that data is available in shared memory 412-1 to be read by parent partition 402-P. Before parent partition 402-P read the first set of data and modifies the output portion 614-1 of trigger page 610-1, child partition 402-1 then writes a second set of data to shared memory 412-1 and accesses the output portion 614-1 of trigger page 610-1. Since parent partition 402-P has not yet read the data in shared memory 412-1 and modified the output portion 614-1 of trigger page 610-1, child partition 402-1 determines that output portion 614-1 of trigger page 610-1 still indicates that data is available in shared memory 412-1 to be read by parent partition 402-P. Therefore, child partition does not modify output portion 614-1 of trigger page 610-1 after writing the second set of data to shared memory 412-1. When parent partition 402-P reads the data in shared memory 412-1, it will read both the first set of data and the second set of data.

In another example, child partition 402-1 writes a first set of data to shared memory 412-1 and accesses the output portion 614-1 of trigger page 610-1. Child partition 402-1 determines that output portion 614-1 of trigger page 610-1 does not indicate that data is available in shared memory 412-1 to be read by parent partition 402-P, and child partition 402-1 modifies output portion 614-1 of trigger page 610-1 to indicate that data is available in shared memory 412-1 to be read by parent partition 402-P. Child partition 402-1 sends a system event signal 620 to hypervisor 202 which accesses output portion 614-1 of trigger page 610-1 and sends a notification to parent partition indicating that data is available to be read in shared memory 412-1. Parent partition begins to read the first set of data in the shared memory when child partition 402-1 writes a second set of data to shared memory 412-1. After writing the second set of data to shared memory 412-1, child partition 402-1 accesses the output portion 614-1 of trigger page 610-1. Since parent partition 402-P has not finished reading the data in shared memory 412-1, it has not yet modified output portion 614-1 of trigger page 610-1. Therefore, because output portion 614-1 of trigger page 610-1 still indicates that data is available in shared memory 412-1 to be read by parent partition 402-P, child partition does not modify output portion 614-1 of trigger page 610-1 after writing the second set of data. Parent partition 402-P continues reading all of the data available in shared memory 412-1, including both the first set of data and the second set of data, and then parent partitions 402-P modifies output portion 614-1 of trigger page 610-1 to indicate that data is not available in shared memory 412-1 to be read by parent partition 402-P.

Figure 9:
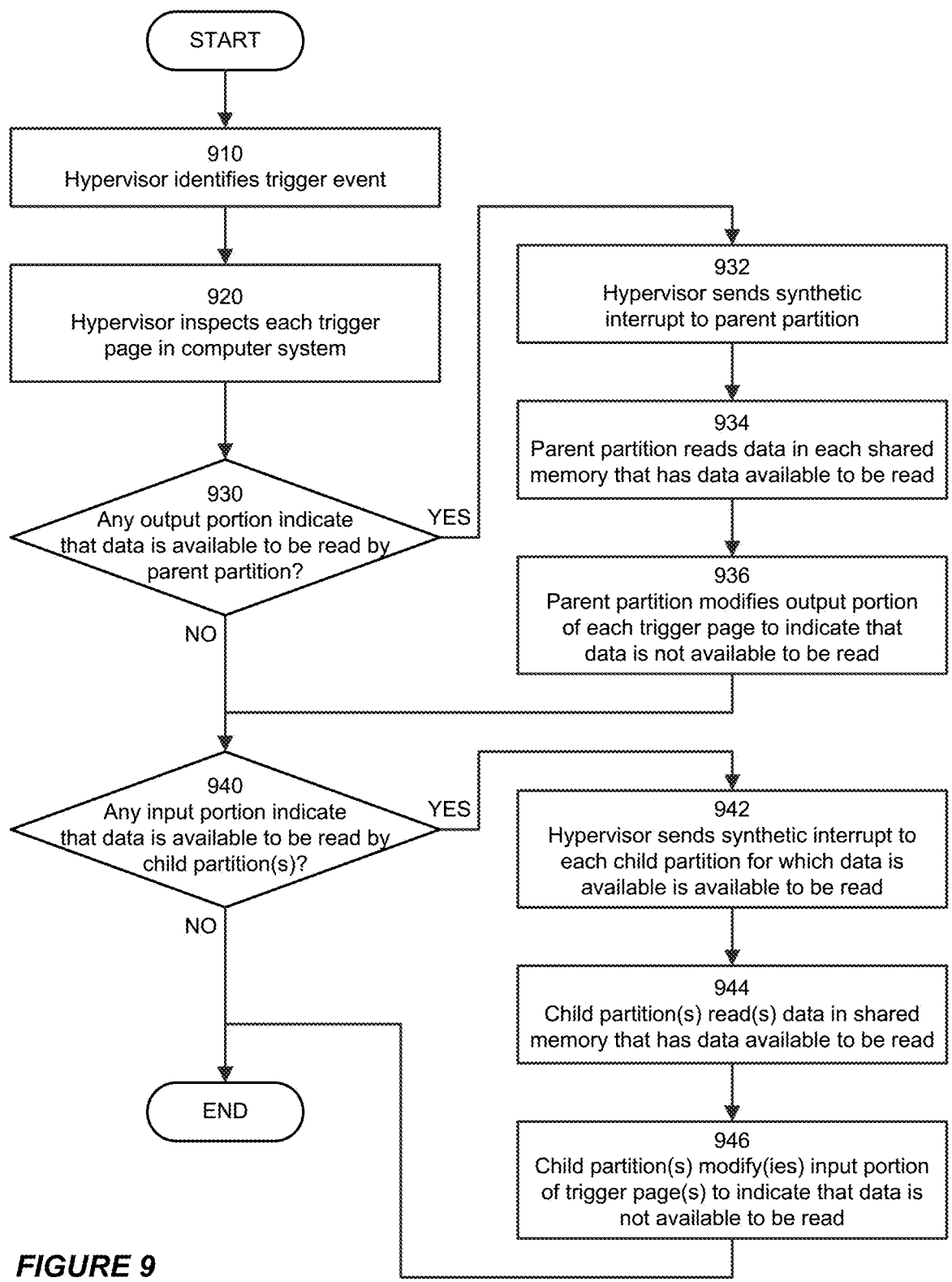
FIG. 9 depicts a method of using a trigger page to notify a virtual machine partition when data is available to read from a shared memory.

Referring now to FIG. 9, depicted is another embodiment of the present invention. Hypervisor 202 identifies 910 a trigger event in computer system 600. The trigger event can be a system event sent by parent partition 402-1, an intercept sent by any of the partitions, a hardware event (e.g., the powering down of one or more processor(s) 102, an operation of one of devices 404), or any other similar event. In response to identifying the system event, the hypervisor 202 accesses 920 each trigger page 610-1 and 610-N in the computing system 600. Hypervisor 202 determines 930 whether any output portion 614-1 and 614-N of trigger pages 610-1 and 610-N indicates that data is available in any of shared memories 412-1 and 412-N to be read by parent partition 402-P. Hypervisor 202 also determines 740 whether any input portion 612-1 and 612-N of trigger pages 610-1 and 610-N indicates that data is available in shared memories 412-1 and 412-N to be read by any of child partitions 402-1 and 402-N.

If the hypervisor 202 determines that any output portion 614-1 and 614-N of trigger pages 610-1 and 610-N indicates that data is available in any of shared memories 412-1 and 412-N to be read by parent partition 402-P, hypervisor 202 sends 932 a notification to parent partition 402-P indicating which of shared memories 412-1 and 412-N has data available to be read. Parent partition then reads 934 data from each shared memory 412-1 and 412-N that has data available to be read and modifies 934 the corresponding output portions 614-1 and 614-N of trigger pages 610-1 and 610-N. If the hypervisor 202 determines that any input portion 612-1 and 612-N of trigger pages 610-1 and 610-N indicates that data is available in shared memories 412-1 and 412-N to be read by any of child partitions 402-1 and 402-N, hypervisor 202 sends 942 a notification to those child partitions 402-1 and 402-N for which data is available to be read in shared memories 412-1 and 412-N. Those child partitions 402-1 and 402-N that receive a notification from hypervisor 202 then read 944 data from their corresponding shared memories 412-1 and 412-N and modify 944 the corresponding input portions 614-1 and 614-N of trigger pages 610-1 and 610-N to indicate that data is not available in shared memories 412-1 and 412-N to be read by child partitions 402-1 and 402-N.

The trigger events identified by the hypervisor can be any type of event in the computer system 600. Preferably, the hypervisor would identify trigger events that would cause loss of data or function. For example, if one of devices 404 were about to be disengaged, an indication that the device was about to be disengaged may be a trigger event. The hypervisor may identify this trigger event and respond by checking all of the trigger pages in the system. This will allow any outstanding data to be cleared out of shared memories so that any outstanding related to the device can be completed before the device is disengaged.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method for use in a computing system, the computing system having operating thereon a parent partition, at least two child partitions, and a hypervisor, wherein the at least two child partitions have associated therewith a shared memory and a trigger information storage area, the method comprising:
    receiving, by the hypervisor, a system event signal sent by a first child partition, the first child partition being one of the at least two child partitions;
    accessing, by the hypervisor, a first trigger information storage area associated with the first child partition in response to receiving the system event signal; and
    determining, by the hypervisor, whether the first trigger information storage area indicates that a first shared memory associated with the first child partition contains data to be read; and
    notifying the parent partition or the first child partition that data is available to be read from the first shared memory.

2. The method of claim 1, wherein the accessing comprises accessing an output portion of the first trigger information storage area, the determining comprises determining whether the output portion of the first trigger information storage area indicates that the first shared memory contains data to be read by the parent partition, and the notifying comprises notifying the parent partition that data is available to be read from the first shared memory.

3. The method of claim 1, wherein the accessing comprises accessing an input portion of the first trigger information storage area, the determining comprises determining whether the input portion of the first trigger indicates that the first shared memory contains data to be read by the first child partition, and the notifying comprises notifying the first child partition that data is available to be read from the first shared memory.

4. The method of claim 1, further comprising:
    writing, by the first child partition, data to the first shared memory before sending the system event signal to the hypervisor.

5. The method of claim 4, further comprising:
    accessing, by the first child partition, an output portion of the first trigger information storage area after writing the data to the first shared memory; and
    determining, before sending the system event signal to the hypervisor, whether the output portion of the first trigger information storage area indicates that data is available in the first shared memory to be read by the parent partition.

6. The method of claim 5, wherein the determining comprises determining that the output portion of the first trigger information storage area does not indicate that data is available in the first shared memory to be read by the parent partition, the method further comprising:
    modifying, by the first child partition, the output portion of the first trigger information storage area to indicate that data is available in the first shared memory to be read by the parent partition before sending the system event signal.

7. The method of claim 1, further comprising:
    identifying, by the hypervisor, a trigger event;
    accessing a plurality of trigger information storage areas associated with a plurality of shared memories in response to identifying the trigger event; and
    determining whether any of the plurality of trigger information storage areas indicates that data is available in one of the plurality of shared memories to be read by at least one of: the parent partition and one of the plurality of child partitions.

8. The method of claim 7, wherein the determining comprising determining that at least one of the plurality of trigger information storage areas indicates that data is available in one of the plurality of shared memories to be read by the parent partition, the method further comprising:

sending, from the hypervisor to the parent partition, an indication of the one of the plurality of shared memories in which data is available to be read by the parent partition.

9. The method of claim 7, the determining comprising determining that at least one of the plurality of trigger information storage areas indicates that data is available in one of the plurality of shared memories to be read by one of the at least two child partitions, the method further comprising:

sending, from the hypervisor to the one of the at least two child partitions, an indication that data is available in the one of the plurality of shared memories to be read by the one of the at least two child partitions.

10. The method of claim 1, wherein the first trigger information storage area provides a flag indicating when data is available in shared memory to be read by either the parent partition or the first child partition.

11. A computing system, comprising:
a parent partition having access to at least one device in the computing system;
at least two child partitions comprising a first child partition, wherein the parent partition is configured to virtualize requests of the at least two child partitions to access the at least one device;
at least two shared memories, the at least two shared memories associated with one of the at least two child partitions;
at least two trigger information storage areas, the at least two trigger information storage areas associated with one of the at least two shared memories; and
a hypervisor configured to arbitrate processor and memory resources among the parent partition and the at least two child partitions, the hypervisor being further configured to:
access a first trigger information storage area in response to receiving a system event signal from the first child partition, the first trigger information storage area being associated with a first shared memory of the at least two shared memories, and the first shared memory being associated with the first child partition; and
determine whether the first trigger information storage area indicates that data in the first shared memory is available to be read by at least one of: the parent partition and the first child partition.

12. The system of claim 11, further comprising:
notify at least one of: the parent partition and the first child partition whether data is available to be read from the first shared memory.

13. The system of claim 11, the system event signal is at least one of: a virtual processor halt signal and a timeslice end signal.

14. The system of claim 11, further comprising:
determine, by the hypervisor, that at least one of the at least two trigger information storage areas indicates that data is available in one of the at least two shared memories to be read by the parent partition; and
in response to the determination that at least one of the at least two trigger information storage areas indicates that data is available in one of the plurality of shared memories to be read by the parent partition, send, from the hypervisor to the parent partition, an indication of the one of the at least two shared memories in which data is available to be read by the parent partition.

15. The system of claim 11, wherein the at least two trigger information storage areas comprise an input portion and an output portion, wherein the input portion contains data indicating whether data in one of the at least two shared memories is available to be read by one of the at least two child partitions, and the output portion containing data indicating whether data in one of the at least shared memories is available to be read by the parent partition.

16. The system of claim 11, wherein the first trigger information storage area provides a flag indicating when data is available in shared memory to be read by either the parent partition or the first child partition.

17. A computer readable device comprising instructions for a hypervisor operating in a computing system, the computing system also having operating therein a parent partition, at least two child partitions, at least two shared memories, and at least two trigger information storage areas associated with one of the at least two shared memories, wherein the at least two shared memories are associated with one of the at least two child partitions, the instructions when executed at least:
receive a system event signal sent by a first child partition, the first child partition being one of at least two child partitions;
access a first trigger information storage area from the plurality of trigger information storage areas in response to receiving the system event, the first trigger information storage area being associated with a first shared memory of the at least two shared memories, and the first shared memory being associated with the first child partition; and
determine whether the first trigger information storage area indicates that the first shared memory associated with the first child partition contains data to be read by at least one of: the parent partition and the first child partition.

18. The computer readable device of claim 17, further comprising:
instructions to notify at least one of: the parent partition and the first child partition whether data is available to be read from the first shared memory.

19. The computer readable device of claim 17, the instructions further comprising:
instructions to access a second trigger information storage area in response to receiving a system event from a second child partition, the second trigger information storage area being associated with a second shared memory of the plurality of shared memories, and the second shared memory being associated with the second child partition; and
instructions to determine that the second trigger information storage area indicates that the second shared memory associated with the second child partition contains data to be read by at least one of: the parent partition and the second child partition.

20. The computer readable device of claim 19, the instructions further comprising:
instructions to notify that at least one of: the parent partition and the second child partition whether data is available to be read from the second shared memory.

* * * * *